(12) United States Patent
Lück

(10) Patent No.: US 11,415,206 B2
(45) Date of Patent: Aug. 16, 2022

(54) LINEAR ACTUATOR

(71) Applicant: LINAK A/S, Nordborg (DK)

(72) Inventor: Jens Lück, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 16/960,983

(22) PCT Filed: Jan. 22, 2019

(86) PCT No.: PCT/DK2019/000030
§ 371 (c)(1),
(2) Date: Jul. 9, 2020

(87) PCT Pub. No.: WO2019/141323
PCT Pub. Date: Jul. 25, 2019

(65) Prior Publication Data
US 2020/0340564 A1    Oct. 29, 2020

(30) Foreign Application Priority Data

Jan. 22, 2018 (DK) .......................... PA 2018 00039

(51) Int. Cl.
*F16H 25/20* (2006.01)
*F16H 25/24* (2006.01)
(Continued)

(52) U.S. Cl.
CPC ......... *F16H 25/2454* (2013.01); *F16H 25/20* (2013.01); *H02K 7/06* (2013.01);
(Continued)

(58) Field of Classification Search
CPC .................. F16H 25/2454; F16H 25/20; F16H 2025/2031; F16H 2025/2046;
(Continued)

(56) References Cited

U.S. PATENT DOCUMENTS

| 5,765,668 A * | 6/1998 | Hasselberg ............. F16H 25/20 188/134 |
| 5,910,692 A | 6/1999 | Saeda et al. |
| 2020/0300344 A1* | 9/2020 | Matsuto .............. F16H 25/2204 |

FOREIGN PATENT DOCUMENTS

| DE | 102010019344 B3 | 5/2011 |
| DE | 102015119457 A1 | 5/2017 |

(Continued)

*Primary Examiner* — Randell J Krug
(74) *Attorney, Agent, or Firm* — Dykema Gossett PLLC

(57) ABSTRACT

Linear actuator comprising an electric motor (2) which through a transmission (3) drives a spindle unit, where the spindle unit comprises at least one spindle (4) with a spindle nut (5), where the spindle (4) is equipped with a bearing (8). In connection with the spindle unit there is an adjustment element (6), typically tubular. In order to retain the adjustment element (6) in a given position when the power supply for the electric motor (2) is interrupted, a brake (11) comprising a spring (15) and a cylindrical element (12) is provided. The cylindrical element (12) has a threaded pin (12a) on which a nut (13) is arranged, and where the spring (15) is positioned around the cylindrical element (12) between one side of the nut (12) and a stop (14) on the cylindrical element (12) such that the spring (15) presses the nut (13) with its other side against a contact surface (16). The brake power is thus generated by the nut rubbing against the contact surface with its one side. It is thus an alternative brake construction having a simple construction and where the spring only exerts a compressive force. The brake power can be adjusted to the spring power, and the friction between the nut and the contact surface and finally the thread pitch on the nut.

6 Claims, 3 Drawing Sheets

Figure 1:
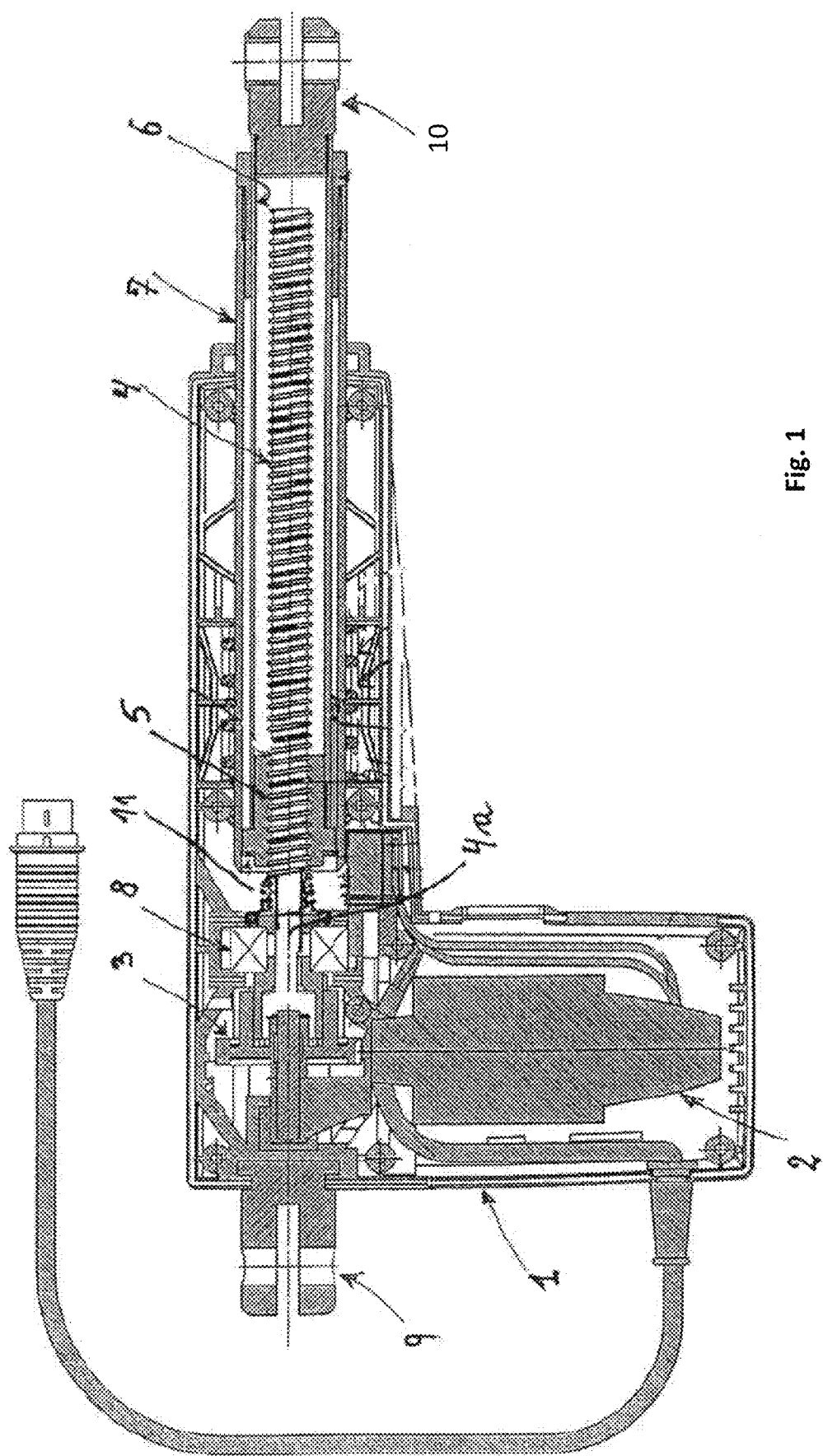

(51) Int. Cl.
*H02K 7/06* (2006.01)
*H02K 7/116* (2006.01)

(52) U.S. Cl.
CPC ...... *H02K 7/1166* (2013.01); *F16H 2025/209* (2013.01); *F16H 2025/2031* (2013.01); *F16H 2025/2046* (2013.01); *F16H 2025/2084* (2013.01)

(58) Field of Classification Search
CPC ...... F16H 2025/2084; F16H 2025/209; H02K 7/06; H02K 7/1166
See application file for complete search history.

(56) References Cited

FOREIGN PATENT DOCUMENTS

| EP | 0662573 B1 | 4/1998 |
|----|------------|--------|
| WO | 1995/010716 A1 | 4/1995 |
| WO | 2005/0079134 A2 | 9/2005 |

\* cited by examiner

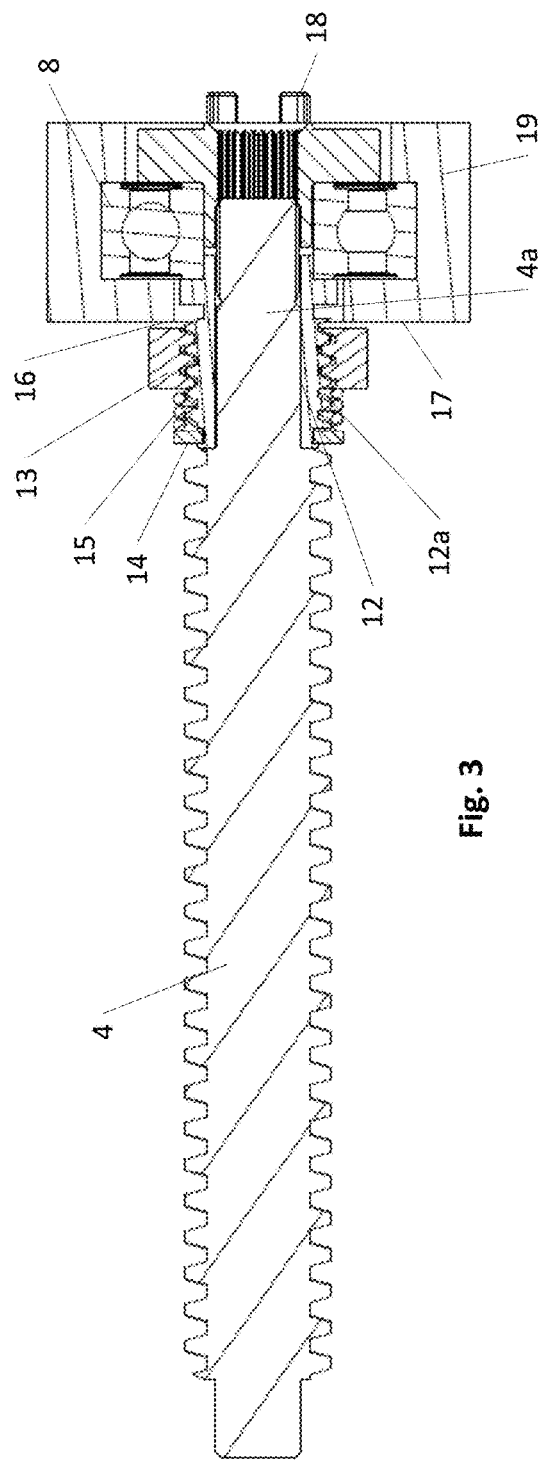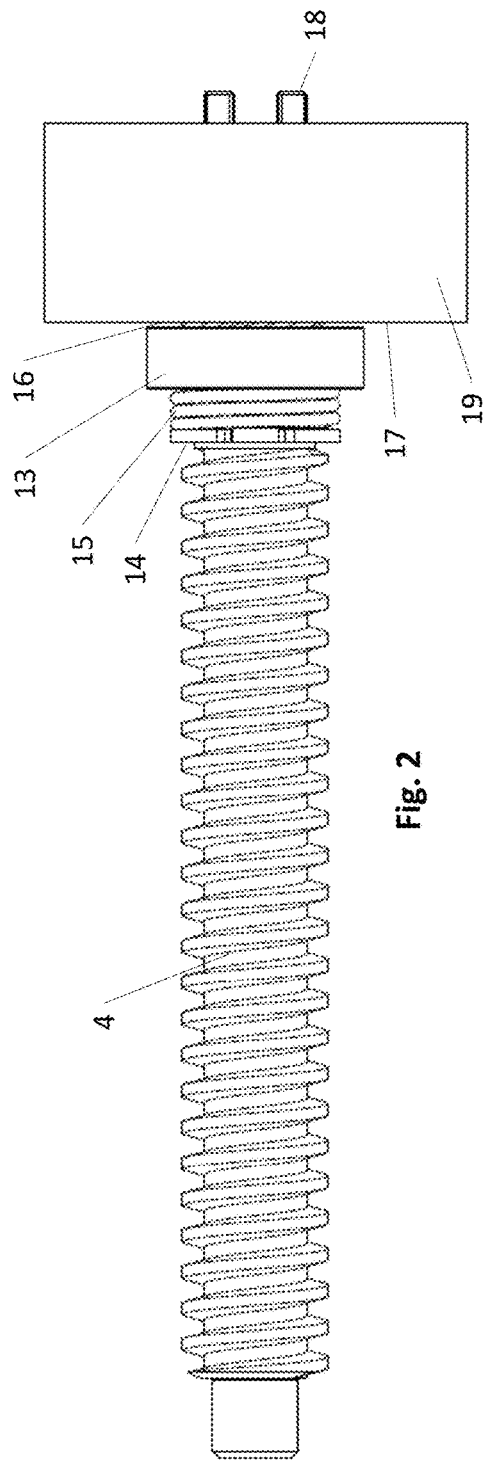

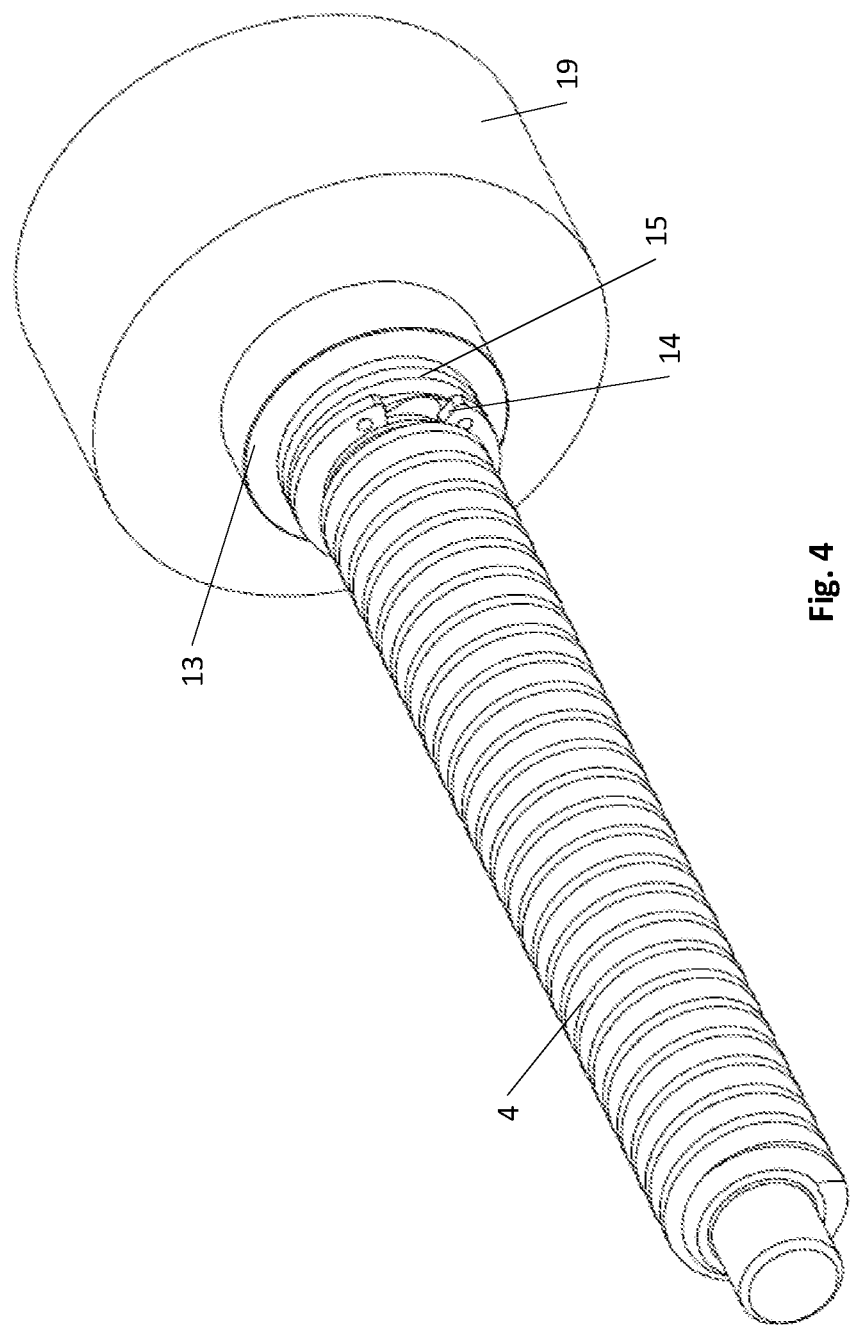

LINEAR ACTUATOR

CROSS-REFERENCE TO RELATED APPLICATIONS

This application is a national stage filing based upon international application no. PCT/DK2019/000030, filed 22 Jan. 2019 (the '030 application), and published in English on 25 Jul. 2019 under international publication no. WO 2019/141323 A1, which claims priority to Denmark (DK) patent application no. PA 2018 00039, filed 22 Jan. 2018 (the '039 application). The '030 application and the '039 application are both hereby incorporated by reference as though fully set forth herein.

The invention relates to a linear actuator comprising an electric motor with a motor shaft, a transmission in connection with the motor shaft, a spindle unit in connection with the transmission, said spindle unit comprising at least one spindle with a spindle nut and where the spindle is equipped with a bearing, an adjustment element in connection with the spindle unit, a brake comprising a spring, and a cylindrical element for retaining the adjustment element in a given position when the power supply for the electric motor is interrupted.

In general, linear actuators should be self-locking to ensure that the activation element also under maximum load remains in the desired position when the power supply for the electric motor is interrupted. In that respect, the linear actuators can overall be divided into those equipped with a self-locking spindle and those equipped with a non-self-locking spindle. Whether a spindle is self-locking or not primarily depends on the thread pitch. If the thread pitch is lower than the friction coefficient the spindle is self-locking and if the thread pitch is larger, the spindle is non-self-locking. The friction is however ambiguous and depends on various conditions such as material, the processing of the material, lubrication, temperature and dynamic influences, such as vibrations. Moreover, there is a difference between the static friction and the dynamic friction, where the static friction is larger than the dynamic.

There are multiple reasons why non-self-locking spindles are preferred over self-locking spindles. One of the reasons is that the non-self-locking spindles have a higher efficiency compared to the self-locking spindles, which means that they are less energy-consuming to operate than the self-locking spindles. Another reason is that the non-self-locking spindles, due to the larger thread pitch, have a quicker adjustment speed that the self-locking spindles. On the other hand, it should be considered that the linear actuator in general should be self-locking, in order for the activation element to remain in the position, it had reached, when the power supply for the motor was interrupted. This results in a spindle having a thread pitch on the verge of being self-locking often being chosen.

In actuators with unambiguous self-locking spindles, such as ballscrews, a "parking brake" is used, which prevents the spindle from rotating when the power supply for the electric motor is interrupted, and thus retains the activation element in the position, it had reached, when the power supply for the motor was interrupted. The "parking brake" can e.g. be a solenoid brake or a coil spring, where the ends of the spring are activated. The solenoid brake comprises a brake disc, which is operated by an electro magnet. As to the "parking brake" with the coil spring, this tightens with its outer side against the surrounding wall, and in the hollow of the spring there is a claw clutch, where the two bent ends of the spring are in engagement with a respective part of the claw clutch each. When the motor is initiated, the claw clutch pulls in one or the other end of the spring and tightens this to reduce the diameter of the spring, by which the spring enters out of engagement with the surrounding wall. Here, the spring functions as a clutch spring and does not as such exert an actual braking function. Such a "parking brake" is e.g. disclosed in WO 2005/079134 A2, LINAK A/S. These brakes are particularly effective but are relatively expensive and take up a relatively large amount of space and result in an increased build-in length of the actuator. Another type of brake, which is not only a parking brake and which is typically used when the spindle is on the verge of being self-locking, comprises two cylindrical elements coupled by means of a coil spring. A needle bearing is located between the two cylindrical elements and a friction disc is located between the free end of one of the two cylindrical elements and a fixed part. In one direction of rotation of the spindle, the two cylindrical elements are mutually released, and the spindle can rotate freely. In the other direction of rotation, the two cylindrical elements are coupled, by which the friction disc is activated for braking of the spindle. Here, the spring also functions as a clutch spring, as it couples and disengages the two cylindrical elements, respectively. Such a brake is e.g. disclosed in U.S. Pat. No. 5,910,692 B1, Tsubakimoto Chain Co. It is noted that this type of brake was originally developed and introduced by Warner Electric Inc., USA. This construction of a brake is per se fine, but consists of relatively many components, is relatively expensive, and takes up a lot of space. A different and simpler brake is known, which simply comprises a coil spring positioned around a cylindrical element on the end of the spindle or a gear wheel in the transmission. In one direction of rotation of the spindle, the spring will loosen itself from the cylindrical element and the spindle can rotate freely. This is owing to the fact that the spring with its angular direction is arranged such that it is affected to attempt to unwind itself from the cylindrical element, by which the diameter of the spring is expanded. In the other direction of rotation of the spindle, the spring will tighten itself around the cylindrical element and exert a brake power thus keeping the spindle motionless when the power supply for the motor is interrupted. The brake power is adapted, such that this can be overcome by the motor when the activation element is reversed towards the initial position. The brake thus actively assists in stopping the spindle when the power supply for the motor is interrupted, just as the brake is active when the activation element is reversed towards the initial position, i.e. the brake dampens the return speed of the activation element. Unlike the brakes mentioned above, the spring here functions as an actual brake, i.e. the spring itself exerts the brake power. This brake was developed and introduced by LINAK A/S and is disclosed in EP 0 662 573 B1 to LINAK A/S. This brake is widely used as it is effective and very inexpensive. The brake power is however difficult to determine as the friction is ambiguous and among other things depends on lubrication and temperature. DE to OKIN discloses a version of the brake where the spring brake has a circular cross-section by which the hollow between the two neighbouring windings functions as a reservoir for the lubricant. On the other side, the contact surface of the spring is line-shaped as opposed to a spring having a square cross-section, where the contact surface is flat. Moreover, the spring is traditionally placed on a cylindrical projecting edge of a worm wheel made from plastic, and the spring tends to cut into the plastic, which again makes it difficult to determine the brake power. When the actuator is in operation, heat is generated in the worm gear and during braking to a full stop as well as during the return movement, frictional heat is moreover generated between the spring and the cylindrical element on the side of the worm wheel. This heat generation negatively affects the dimensional stability of the worm wheel, by which the spring with time can more easily cut into the cylindrical element. This problem is e.g. sought solved by placing a metal bushing around the cylindrical element on the worm wheel, such that the spring engages the metal bushing and does not come into direct contact with the worm wheel. However, it does not solve the problem with the heating of the worm wheel and in addition thereto noise is generated when the bushing during its rotation rubs against the spring.

With its starting point in the latter brake construction, the purpose of the invention is to provide an alternative brake construction, which is equally simple but where at least some of the problems outlined above are avoided.

This is achieved according to the invention by constructing the linear actuator as described in claim 1, where a cylindrical element has a threaded pin on which a nut is arranged, and where the spring is positioned around the cylindrical element between one side of the nut and a stop on the cylindrical element, such that the spring presses the nut with its other side against a contact surface. The brake power is thus generated by the nut rubbing against the contact surface with its one side. The exerted brake power thus depends on the spring power. More spring power results in more brake power. The brake power further depends on the friction between the nut and the contact surface. I.e. more friction results in more brake power. Finally, the thread pitch is also of significance for the brake power. A low thread pitch results in a larger brake power. When the cylindrical element rotates with the thread pitch, the nut will tend to screw itself away from the contact surface due to the friction between the nut and the contact surface. On the other hand, when the cylindrical element rotates against the thread pitch, the nut will have a tendency to tighten against the contact surface and thus increase the brake power.

In an embodiment, the spring is cylindrical, such that it can simply be pushed over the threads of the cylindrical element. The decisive factor here is the spring power of the spring, but there are no particular requirements to the precision of the spring wire as is the case in the spring brake according to EP 0 662 573 B1, where the contact surface and the spring tension around the cylindrical element are of substantial significance.

In an alternative embodiment, the spring is a torsional spring, where one end is retained in the nut while the other end is retained in the cylindrical element. In the nut, the end of the spring can expediently be retained in a slot and in the cylindrical element, the spring end can be retained in a groove.

As mentioned above, the brake can be arranged on a cylindrical element in the actuator, and in an embodiment, it is arranged on a rear end, the shaft of the spindle, i.e. the spindle unit can be constructed as a unit having a brake ready for mounting in the actuator.

In another embodiment, the brake is arranged on the motor shaft, which has the advantage that the torque, which the brake is exposed to is not very large.

The cylindrical element for the brake can be constituted by the rotating element around which the brake is constructed. In an embodiment, the cylindrical element is constructed as a separate element mounted on the rotating element. Thus, the cylindrical element with thread can be manufactured in a more precise manner or possibly be cast as a unit in a suitable plastic material.

The contact surface, which the nut of the brake cooperates with, can be constituted by a separate element, however expediently, an already existing surface of the actuator is utilized, e.g. a side surface of the housing.

A linear actuator according to the invention will be described more fully below with reference to the accompanying drawing, in which:

FIG. 1 shows a linear actuator comprising a two-part housing, where one part has been removed, FIG. 2 shows a detailed section of the brake of the actuator, FIG. 3 shows a longitudinal section of the section of FIG. 2, and FIG. 4 shows a perspective view of the section of FIG. 2.

FIG. 1 shows an actuator comprising a two-part housing 1 made from plastic with a reversible electric motor 2, which through a worm gear 3 drives a spindle 4 with a spindle nut 5 to which an adjustment element 6 in the shape of an activation rod (also known as the inner tube) surrounded by an outer tube 7 functioning as a guide for the activation rod 6 is secured. With its one end the spindle 4 is embedded with a bearing 8 in the housing 1. The actuator is mounted in the structure in which it should be incorporated by means of a rear mounting 9 mounted at the rear end of the housing 1 and a front mounting 10 at the free end of the activation rod 6.

The rear end, the shaft 4a of the spindle 4, is equipped with a brake mechanism 11 as described more fully with reference to FIGS. 2, 3 and 4 of the drawing. A cylindrical element 12 in the form of a bushing, which is secured against rotation, having a portion with external threads 12a, is mounted on the shaft 4a of the spindle 4. On the threaded pin 12a, a nut 13 is arranged. A stop 14 in the form of a ring is secured to an end, the front end of the cylindrical element 12. Between this stop 14 and the front side of the nut 13, a coil or a coil spring 15 is arranged, which exerts a compressive force on the nut 13. As the threads on the cylindrical element 12 and the nut 13 are non-self-locking, the nut 13 will be pushed backwards against a contact surface 16, which is here constituted by a side of a seat 17 for the bearing 8 for the spindle 4. On the rearmost end of the spindle 4, a clutch part 18 for interconnection with an output stage of the transmission of the actuator is mounted. As it appears from the drawing, the bearing is embedded on a ring-shaped part 19 of the cylindrical element 12 and the clutch part 18.

The invention claimed is:

1. A linear actuator comprising an electric motor (2) with a motor shaft, a transmission (3) in connection with the motor shaft, a spindle unit in connection with the transmission, where the spindle unit comprises at least one spindle (4) with a spindle nut (5), and where the spindle (4) is equipped with a bearing (8), an adjustment element (6) in connection with the spindle unit, a brake (11) for retaining the adjustment element (6) in a given position when a power supply for the electric motor (2) is interrupted, said brake comprising a spring (15), and a cylindrical element (12), wherein the cylindrical element (12) has a threaded pin (12a) on which a nut (13) is arranged, and where the spring (15) is positioned around the cylindrical element (12) between one side of the nut (12) and a stop (14) on the cylindrical element (12) such that the spring (15) presses the nut (13) with its other side against a contact surface (16).

2. The linear actuator according to claim 1, wherein the spring (15) is a coil spring.

3. The linear actuator according to claim 1, wherein the spring (15) is a torsional spring.

4. The linear actuator according to claim 1, wherein the brake (11) is arranged on a rear end of the spindle (4).

5. The linear actuator according to claim 1, wherein the cylindrical element (12) is constructed as a separate element.

6. The linear actuator according to claim 1, further comprising a housing (1), wherein the contact surface (16) is constituted by a side surface of a seat (17) for the bearing (8).

* * * * *